(12) United States Patent
Liu et al.

(10) Patent No.: US 12,313,603 B2
(45) Date of Patent: May 27, 2025

(54) EXPERIMENTAL APPARATUS AND AN EXPERIMENTAL METHOD FOR THE NEGATIVE BENDING MOMENT ZONE OF A CONTINUOUS BEAM TO BEAR LOAD UNDER CHLORIDE ENVIRONMENT

(71) Applicant: Inner Mongolia University of Technology, Hohhot (CN)

(72) Inventors: Shuguang Liu, Hohhot (CN); Liqiang Yin, Hohhot (CN); Yanhai Liu, Hohhot (CN); Changwang Yan, Hohhot (CN); Ju Zhang, Hohhot (CN); Xiaoxiao Wang, Hohhot (CN); Lei Jing, Hohhot (CN)

( * ) Notice: Subject to any disclaimer, the term of this patent is extended or adjusted under 35 U.S.C. 154(b) by 358 days.

(21) Appl. No.: 17/828,818

(22) Filed: May 31, 2022

(65) Prior Publication Data
US 2023/0213422 A1 Jul. 6, 2023

(30) Foreign Application Priority Data
Dec. 30, 2021 (CN) .......................... 202111661083.5

(51) Int. Cl.
*G01N 3/10* (2006.01)
*G01N 3/06* (2006.01)

(52) U.S. Cl.
CPC ................. *G01N 3/10* (2013.01); *G01N 3/06* (2013.01); *G01N 2203/0019* (2013.01); *G01N 2203/0048* (2013.01); *G01N 2203/024* (2013.01); *G01N 2203/04* (2013.01); *G01N 2203/06* (2013.01)

(58) Field of Classification Search
CPC .... G01N 3/10; G01N 3/06; G01N 2203/0019; G01N 2203/0048; G01N 2203/024; G01N 2203/04; G01N 2203/06; G01N 2203/0023; G01N 2203/0264; G01N 3/20
See application file for complete search history.

(56) References Cited

U.S. PATENT DOCUMENTS

| 4,478,086 | A  | * | 10/1984 | Gram ..................... G01N 3/08 73/826 |
| 5,060,516 | A  | * | 10/1991 | Lau ..................... G01M 5/0058 73/579 |
| 11,067,488 | B1 | * | 7/2021 | Zhao ..................... G01N 3/12 |
| 2020/0386661 | A1 | * | 12/2020 | Ye ..................... G01M 5/0025 |

* cited by examiner

*Primary Examiner* — Xin Y Zhong
(74) *Attorney, Agent, or Firm* — Addison D. Ault; IPGentleman Intellectual Property Services, LLC

(57) ABSTRACT

The invention discloses an experimental apparatus and an experimental method for the negative bending moment zone of a continuous beam to bear load under chloride environment, relating to the technical field of engineering experiment, comprising a high-rigidity main frame, a loading system, an erosion system and a test beam; the test beam is detachably arranged on the high-rigidity main frame; the loading system is installed on the high-rigidity main frame and under the test beam, and is used to apply load to the test beam; the erosion system is arranged on the test beam with built-in chloride solution; the test beam is a continuous beam that meets the design requirements. The experimental apparatus provided by the invention is stable and reliable, easy to use, and can provide the experimental conditions for the wet-dry cycle and the load-bearing coupling reaction in chloride environment.

5 Claims, 2 Drawing Sheets

EXPERIMENTAL APPARATUS AND AN EXPERIMENTAL METHOD FOR THE NEGATIVE BENDING MOMENT ZONE OF A CONTINUOUS BEAM TO BEAR LOAD UNDER CHLORIDE ENVIRONMENT

1. TECHNICAL FIELD

The invention relates to the technical field of engineering experiment, in particular to an experimental apparatus and an experimental method for the negative bending moment zone of a continuous beam to bear load under chloride environment.

2. BACKGROUND ART

Continuous beams refer to beams with three or more supports in projects like construction, bridge, aviation, and pipeline, etc. In engineering, the negative bending moment zone of continuous beam bridge bears upward concentrated load. In winter, chloride ice melts are used to remove snow on the street. During the process of snow melting, the street turns dry to wet, which causes the continuous beam to be eroded by chloride solution, and the negative bending moment zone of the continuous beam is subjected to the combined action of concentrated load, chloride erosion and wet-dry cycles. Both the load and the chloride environment have an effect on the bearing capacity of the continuous beam; the effect is exacerbated by the wet-dry cycle. To know the effect of wet-dry cycle on the intrusion of chloride ions into concrete under load and chloride environment, the prior arts all adopt the method of installing devices on the bridge body for detection. This on-site detection method cannot continuously detect the non-constant load, and the chloride ion erosion is hard to detect, hence the detection results are inaccurate, and the cost is high.

3. SUMMARY OF THE INVENTION

The main aim of the invention is to provide an experimental apparatus and an experimental method for the negative bending moment zone of a continuous beam to bear load under chloride environment, in order to solve the above problems.

To achieve the above aim, the invention provides an experimental apparatus for the negative bending moment zone of a continuous beam to bear load under chloride environment, comprising a high-rigidity main frame, a loading system, an erosion system and a test beam; the test beam is detachably arranged on the high-rigidity main frame; the loading system is installed on the high-rigidity main frame and under the test beam, and is used to apply load to the test beam; the erosion system is arranged on the test beam with built-in chloride solution; the test beam is a continuous beam that meets the design requirements.

As an improvement, the high-rigidity main frame comprises an I-steel base, both ends of the I-steel base are fixedly connected with auxiliary bases, square steel columns are arranged on the auxiliary base, and a square steel top beam is arranged on the square steel columns; the loading system is arranged on the I-beam base.

As an improvement, the two square steel columns are symmetrically provided with two support brackets and two reaction force brackets for clamping the test beam; the support brackets are located below the reaction force brackets.

As an improvement, the support brackets and the reaction force brackets are all slid and limited in the vertical direction through the slide rail chute mechanism and the square steel columns; a gear slot is installed on the inner side of the square steel column, a stepping motor is arranged in the reaction force bracket and the support bracket, and the output end of the stepping motor is connected with a gear that meshes with the gear slot; the stepping motor in the support bracket is electrically connected with the support bracket adjuster; the stepping motor in the reaction force bracket is electrically connected with the reaction force bracket adjuster; the support bracket is adjusted vertically through the support bracket adjuster, and the reaction force bracket is adjusted vertically through the reaction force bracket adjuster.

As an improvement, the loading system comprises a hydraulic jack, a load sensor and a load display; the bottom of the hydraulic jack is fixedly connected with the high-rigidity main frame, and the top of the hydraulic jack is connected with the load sensor; the top of the load sensor is in contact with the bottom of the test beam; the load sensor is electrically connected to the load display.

As an improvement, the erosion system comprises an erosion capacity box; the erosion capacity box is a bottomless cubic box, and the bottom of the erosion capacity box is glued to the negative bending moment zone of the test beam.

As an improvement, the apparatus comprises a wet-dry cycle system; the wet-dry cycle system comprises a chloride ion solution storage box, a water inlet pump, a water inlet pipe, a water outlet pump, a water outlet pipe and a wet-dry controller, and the chloride ion solution storage box is connected with the high-rigidity main frame; the water inlet pump is arranged at the bottom of the chloride ion solution storage box; one end of the water inlet pipe is connected with the outlet of the water inlet pump, and the other end is arranged inside the erosion capacity box; the water outlet pump is arranged at the bottom of the erosion capacity box; one end of the water outlet pipe is connected with the outlet of the water outlet pump, and the other end is arranged inside the chloride ion solution storage box; the water inlet pump and the water outlet pump are both electrically connected to the wet-dry controller; the wet-dry controller is arranged on the high-rigidity main frame, a high-precision quantity and time controller is arranged inside the wet-dry controller, and the drying and soaking time is set by the high-precision quantity and time controller.

The invention also provides an experimental method for the negative bending moment zone of a continuous beam to bear load under chloride environment, comprising the following steps:

S1, move the test beam onto the support bracket;

S2, adjust the support brackets upward by the support bracket adjuster, thereby moving the test beam above the loading system; use the reaction force bracket adjuster to move the reaction force brackets to contact with the test beam; move the loading system upward to contact with the bottom of the test beam, then move the support brackets downward;

S3, adjust the hydraulic jack until the load display shows the required load;

S4, put the chloride ion solution into the chloride ion solution storage box, set the number of wet-dry cycles and the time of drying and soaking through the wet-dry controller;

S5, after completing the set number of wet-dry cycles, take out the test beam, stratify and take samples of the negative bending moment zone of the test beam, and test free chloride ion content and total chloride ion content.

As an improvement, Mohr's method is adopted to measure the free chloride ion content, and Volhard's method is adopted to measure the total chloride ion content.

The invention has the following advantageous effects:

The experimental apparatus of the invention can fix the test beam on the loading system and provide the test beam with a reverse balance force by adjusting the adjustable reaction force bracket; the loading system provides the force needed for load-bearing and simulates the load-bearing state; the erosion system and wet-dry cycle system provide conditions for wet-dry cycle in chloride environment; the experimental apparatus provided by the invention is stable and reliable, easy to use, and can provide the experimental conditions for the wet-dry cycle and the load-bearing coupling reaction in chloride environment.

The invention provides an experimental basis for the research on chloride ion corrosion resistance of the negative bending moment zone of the continuous beam. The method of on-site detection is converted to laboratory research, which is not only easy for operation, but also more in line with the theoretical requirement, and the experimental results are more accurate, providing a more convenient detection tool for those skilled in the art.

4. BRIEF DESCRIPTION OF ACCOMPANY DRAWINGS

As shown in the accompanying drawings: 1 I-steel base; 2 refers to the auxiliary base; 3 left steel column; 4 right steel column; 5 left reaction force bracket; 6 right reaction force bracket; 7 reaction force bracket adjuster; 8 left support bracket; 9 right support bracket; 10 support bracket adjuster; 11 steel roof beam; 12 hydraulic jack; 13 load sensor; 14 load display; 15 test beam; 16 negative bending moment zone; 17 erosion capacity box; 18 chloride ion solution storage box; 19 water inlet pump; 20 water inlet pipe; 21 water outlet pump; 22 water outlet pipe; 23 wet-dry controller.

5. SPECIFIC EMBODIMENT OF THE INVENTION

In order to achieve the above purpose and effects, the technical solutions and structure adopted in the invention will be described in detail with reference to the accompanying drawings on the features and functions of the preferred embodiments of the invention.

Figure 1:
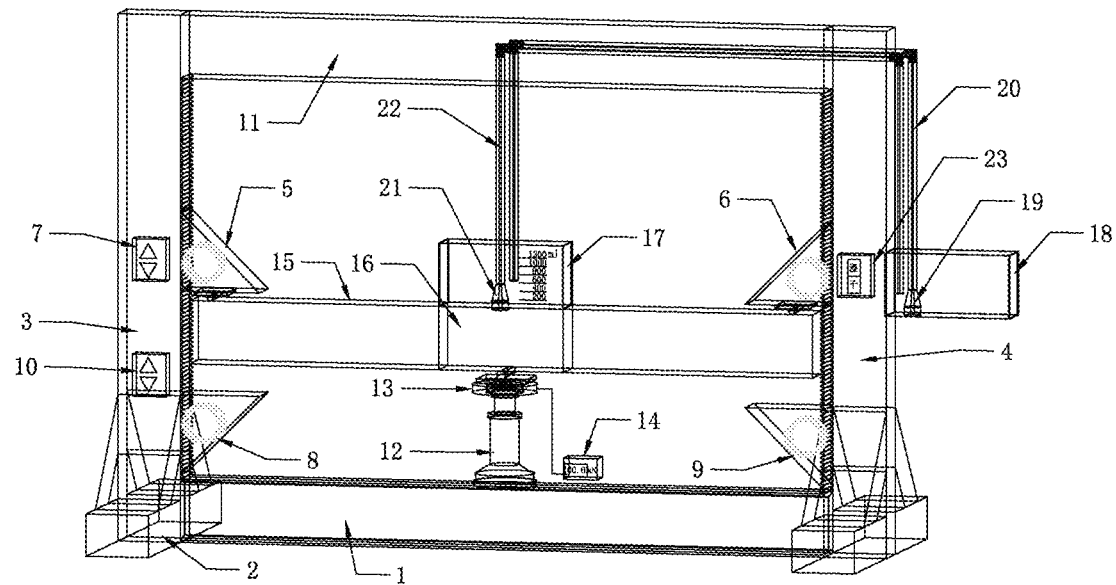
FIG. 1 is a schematic diagram of an experimental apparatus for the negative bending moment zone of a continuous beam to bear load under chloride environment.
Figure 2:
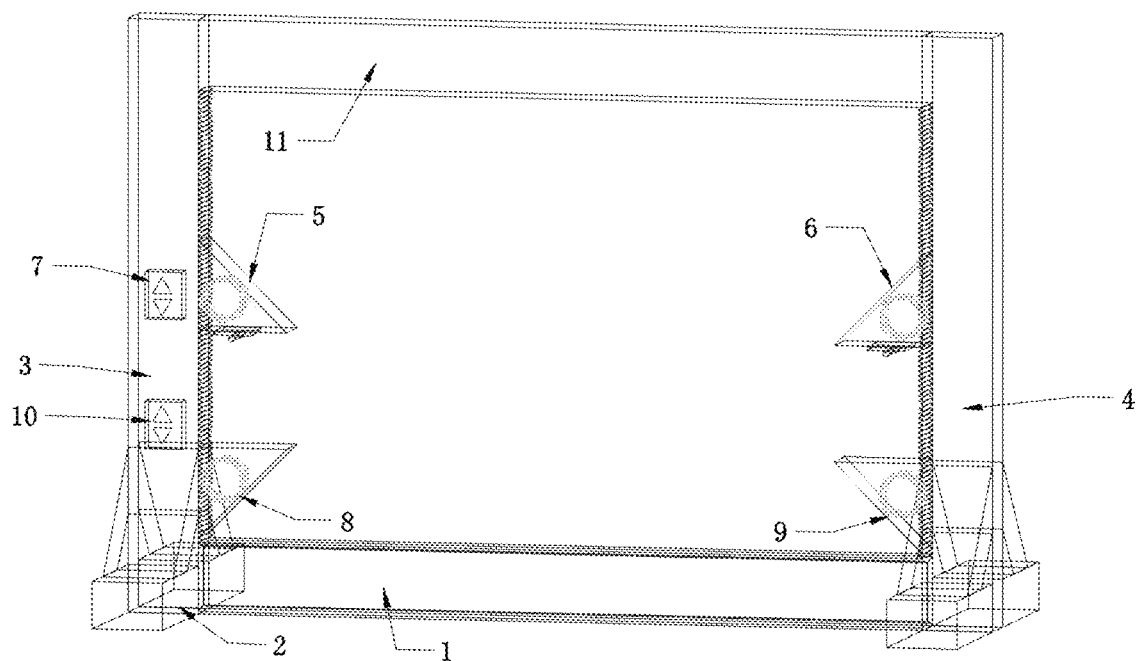
FIG. 2 is a schematic diagram of the high-rigid main frame of the experimental apparatus for the negative bending moment zone of a continuous beam to bear load under chloride environment.
Figure 3:
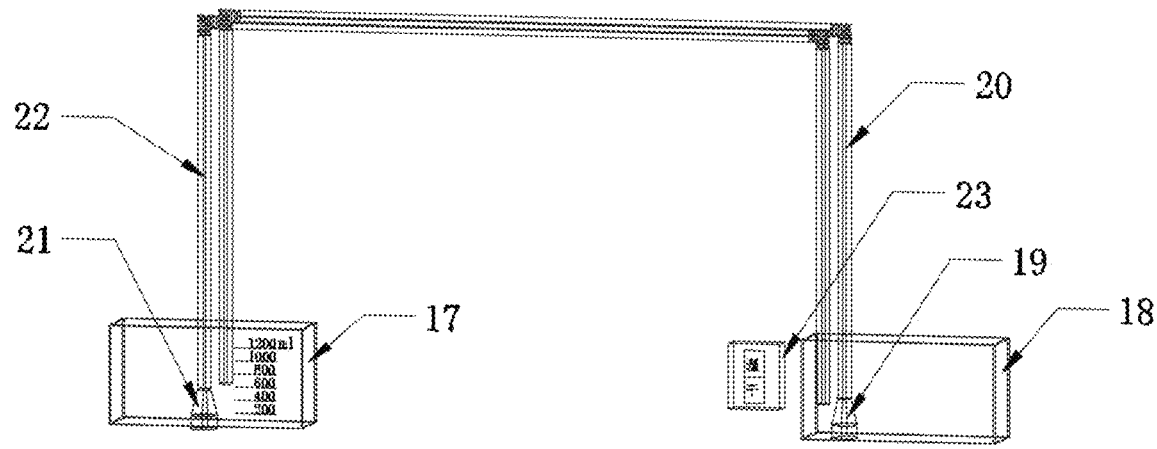
FIG. 3 is the schematic diagram of the erosion system and the wet-dry cycle system of the experimental apparatus for the negative bending moment zone of a continuous beam to bear load under chloride environment.
Figure 4:
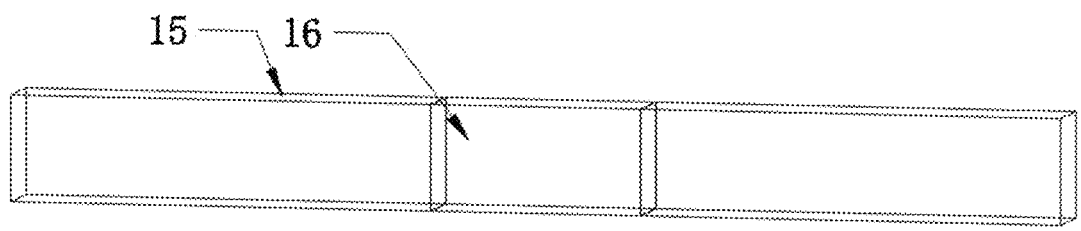
FIG. 4 is the schematic diagram of the loading system and the test beam of the experimental apparatus for the negative bending moment zone of a continuous beam to bear load under chloride environment.
Figure 4:
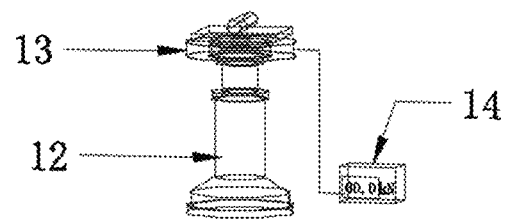

As shown in FIG. 1-FIG. 4, the invention provides an experimental apparatus for the negative bending moment zone of a continuous beam to bear load under chloride environment, comprising a high-rigidity main frame, a loading system, an erosion system and a test beam 15, the test beam 15 is detachably arranged on the high-rigidity main frame; the loading system is installed on the high-rigidity main frame and under the test beam, and is used to apply load to the test beam 15; the erosion system is arranged on the test beam 15 with built-in chloride solution; the test beam 15 is a continuous beam that meets the design requirements.

As an improvement, the high-rigidity main frame comprises an I-steel base 1, both ends of the I-steel base 1 are fixedly connected with auxiliary bases 2, square steel columns are arranged on the auxiliary base 2, and a square steel top beam 11 is arranged on the square steel columns, the square steel columns are divided into left steel column 3 and right steel column 4 which are symmetrically arranged; the loading system is arranged on the I-beam base 1.

As an improvement, the left steel column 3 and the right steel column 4 are symmetrically provided with two support brackets and two reaction force brackets for clamping the test beam 15; the support brackets are located below the reaction force brackets; the support brackets are divided into a left support bracket 8 and a right support bracket 9 that are symmetrically arranged, and the reaction force brackets are divided into a left reaction force bracket 5 and a right reaction force bracket 6 that are symmetrically arranged.

As an improvement, the support brackets and the reaction force brackets are all slid and limited in the vertical direction through the slide rail chute mechanism (not drawn) and the square steel columns; a gear slot is installed on the inner side of the square steel column, a stepping motor is arranged in the reaction force bracket and the support bracket, and the output end of the stepping motor is connected with a gear that meshes with the gear slot; the stepping motor in the support bracket is electrically connected with the support bracket adjuster 10; the stepping motor in the reaction force bracket is electrically connected with the reaction force bracket adjuster 7; the support bracket is adjusted vertically through the support bracket adjuster 10, and the reaction force bracket is adjusted vertically through the reaction force bracket adjuster 7, providing an opposite force to the test beam 15.

As an improvement, the loading system comprises a hydraulic jack 12, a load sensor 13 and a load display 14; the bottom of the hydraulic jack 12 is fixedly connected with the high-rigidity main frame, and the top of the hydraulic jack 12 is connected with the load sensor 13; the top of the load sensor 13 is in contact with the bottom of the test beam 15; the load sensor 13 is electrically connected to the load display 14, and the load display 14 can display the load in real time.

As an improvement, the erosion system comprises an erosion capacity box 17, and the erosion capacity box 17 is a bottomless cube box with a scale composed of a transparent PVC hard plastic plate; fix the erosion capacity box 17 at the negative bending moment zone 16 of the test beam 15 with high viscosity glue, and use epoxy resin to do leak-proof treatment to the erosion capacity box 17.

As an improvement, the apparatus comprises a wet-dry cycle system; the wet-dry cycle system comprises a chloride ion solution storage box 18, a water inlet pump 19, a water inlet pipe 20, a water outlet pump 21, a water outlet pipe 22 and a wet-dry controller 23; the chloride ion solution storage box 18 is a coverless cube box with a capacity of 10 L composed of stainless steel iron sheets, and the chloride ion solution storage box 18 is connected with the high-rigidity main frame; the water inlet pump 19 is arranged at the bottom of the chloride ion solution storage box 18; one end of the water inlet pipe 20 is connected with the water outlet of the water inlet pump 19, and the other end is arranged inside the erosion capacity box 17; the water outlet pump 21 is arranged at the bottom of the erosion capacity box 17; one end of the water outlet pipe 22 is connected with the water outlet of the water outlet pump 21, and the other end is arranged inside the chloride ion solution storage box 18; the water inlet pump 19 and the water outlet pump 21 are both electrically connected to the wet-dry controller 23; the wet-dry controller 23 is arranged on the high-rigidity main frame, the water inlet pump 19 and the water outlet pump 21 are controlled by the wet-dry controller 23; a high-precision quantity and time controller is arranged inside the wet-dry controller 23, and the wet-dry controller 23 can set the time of drying and soaking; when soaking, the wet-dry controller 23 starts the water inlet pump 19 to inject 1000 ml of chloride ion solution into the erosion capacity box 17 through the water inlet pipe 20; when drying, the wet-dry controller 23 starts the water outlet pump 21 to extract the chloride ion solution in the erosion capacity box 17 through the water outlet pipe 22.

The invention also provides an experimental method for the negative bending moment zone of a continuous beam to bear load under chloride environment. The following is an embodiment of the load-bearing coupling effect and the wet-dry cycle of the negative moment zone of a continuous concrete beam in a chloride environment. The specific experimental steps are:

S1, clean the test beam 15 with absorbent cotton balls soaked in acetone until no stains are visible on the cotton balls, then move the cleaned test beam 15 onto the support brackets;

S2, adjust the support brackets upward by the support bracket adjuster 10, moving the test beam 15 to 2 cm above the loading system, adjust the reaction force brackets to contact with test beam 15 by the reaction force bracket adjuster 7, raise the loading system to contact with the lower part of the test beam 15, and adjust the support brackets downward for 15 cm;

S3, adjust hydraulic jack 12 to load at 1 kN per stage, stand for 10 minutes every after until the load display 14 shows the required load, stand for another 24 h when the load of the load display 14 is stable;

S4, glue the erosion capacity box 17 above the negative bending moment zone 16 of the test beam 15, use epoxy resin for leak-proof treatment, then put chloride ion solution into the chloride ion solution storage box, and set 6 wet-dry cycles, dry for 7 d and wet for 7 d, total 14 d is one wet-dry cycle;

S5, After the wet-dry cycles of the settled number of times, take out the test beam 15, stratify and sample the negative bending moment zone 16 of the test beam 15, each layer is 5 mm, total 5 layers; cut a 5 mm thick slice with a cutting machine, dry the slice and then grind it, weigh 2 g sample powder and dissolve it in 50 ml distilled water, shake vigorously for 2 min, and then soak for 24 h; obtain the filtrate after 24 h, test the free chloride ion content in the filtrate by the Mohr's method, and test the total chloride ion content in the filtrate by the Volhard's method.

The above descriptions are only preferred embodiments of the invention, rather than all embodiments. Anyone should note that the structural changes made under the inspiration of the invention, all technical solutions that are the same or similar to the invention fall within the protection scope of the invention.

The invention claimed is:

1. An experimental apparatus for a negative bending moment zone of a continuous beam to bear load under chloride environment, comprising:
    a high-rigidity main frame, wherein the high-rigidity main frame comprises an I-steel base, auxiliary bases, a left steel column, a right steel column, a square steel top beam, a left support bracket, a right support bracket, a left reaction force bracket, and a right reaction force bracket; two opposite ends of the I-steel base are fixedly connected with the auxiliary bases respectively, the left steel column and the right steel column are vertically arranged on the auxiliary bases respectively and spaced from each other, and two opposite ends of the square steel top beam are respectively arranged on ends of the left steel column and the right steel column facing away from the auxiliary bases; the left support bracket and the left reaction force bracket are arranged on the left steel column and slidable between the I-steel base and the square steel top beam along the left steel column in a vertical direction, and the left support bracket is located below the left reaction force bracket; the right support bracket and the right reaction force bracket are arranged on the right steel column and slidable between the I-steel base and the square steel top beam along the right steel column in the vertical direction, the right support bracket is located below the right reaction force bracket;
    a loading system, wherein the loading system comprises a hydraulic jack, a load sensor and a load display; a bottom of the hydraulic jack is fixedly connected with the I-steel base, a top of the hydraulic jack is connected with the load sensor, and the load sensor is electrically connected to the load display;
    an erosion system, wherein the erosion system comprises an erosion capacity box with a scale, and the erosion capacity box is made of a transparent material; and
    a test beam, wherein the test beam is a continuous beam that meets design requirements, one end of the test beam is detachably arranged between the left support bracket and the left reaction force bracket, and another opposite end of the test beam is detachably arranged between the right support bracket and the right reaction force bracket; a top of the load sensor is in contact with the test beam and thereby the hydraulic jack and the load sensor are located between the I-steel base and the test beam; a bottom of the erosion capacity box is glued onto a negative bending moment zone of the test beam and thereby the erosion capacity box is located between the test beam and the square steel top beam, and the erosion capacity box is configured to supply a chloride solution to erode the negative bending moment zone of the test beam.

2. The experimental apparatus for the negative bending moment zone of the continuous beam to bear load under chloride environment as claimed in claim 1, wherein a reaction force bracket adjuster and a support bracket adjuster are disposed on the left steel column, the reaction force bracket adjuster is configured to adjust the left reaction force bracket and the right reaction force bracket to move up and down, and the support bracket adjuster is configured to adjust the left support bracket and the right support bracket to move up and down.

3. The experimental apparatus for the negative bending moment zone of the continuous beam to bear load under chloride environment as claimed in claim 1, further comprising a wet-dry cycle system; wherein the wet-dry cycle system comprises a chloride ion solution storage box, a water inlet pump, a water inlet pipe, a water outlet pump, and a water outlet pipe; the chloride ion solution storage box is connected to the right steel column, the water inlet pump is disposed on a bottom of the chloride ion solution storage box, one end of the water inlet pipe is connected to an outlet of the water inlet pump, and another end of the water inlet pipe is disposed in the erosion capacity box; and the water outlet pump is disposed on the bottom of the erosion capacity box, one end of the water outlet pipe is connected to the water outlet pump, and another end of the water outlet pipe is disposed in the chloride ion solution storage box.

4. The experimental apparatus for the negative bending moment zone of the continuous beam to bear load under chloride environment as claimed in claim 3, wherein the wet-dry cycle system further comprises a wet-dry controller, and the wet-dry controller is disposed on the right steel column; the water inlet pump and the water outlet pump are electrically connected to the wet-dry controller; and the wet-dry controller is configured to control a number of wet-dry cycles and a time of drying and soaking during an experimental process.

5. The experimental apparatus for the negative bending moment zone of the continuous beam to bear load under chloride environment as claimed in claim 1, wherein the erosion capacity box is a bottomless cubic box with the scale and composed of a transparent polyvinyl chloride (PVC) plastic plate.

* * * * *